United States Patent Office 2,849,449
Patented Aug. 26, 1958

2,849,449

ARYL METHYLENEAMINO - SUBSTITUTED 3-CYANOTHIOPHENES AND THEIR PREPARATION

Arthur C. Cope, Belmont, Mass., and Bruce S. Fisher, Philadelphia, Pa., assignors to E. I. du Pont de Nemours and Company, Wilmington, Del., a corporation of Delaware No Drawing. Application April 20, 1955
Serial No. 502,723

18 Claims. (Cl. 260—240)

This invention relates to new aromatic aldehyde derivatives of 2,5-diaminothiophenes. More particularly this invention relates to new and highly colored substituted thiophenes which have both cyano and aromatic methyleneamino groups attached to the thiophene nucleus.

Thiophene is a five-membered sulfur-containing heterocyclic compound which contains two nuclear carbon-to-carbon unsaturations. The compound has rather unexpected properties in that it and its unsaturation resemble that of benzenoid compounds in many respects. Although thiophene compounds have interesting properties, little use has been made of compounds containing the thiophene nucleus. Amino-containing thiophene compounds heretofore available are indicated to be very unstable as shown in German Patent 257,462 and by Hartough, "Thiophene and Derivatives," Interscience, 1952, pages 228–229.

Substituted thiophenes have recently been prepared as disclosed and claimed in the U. S. patent application of W. J. Middleton, Serial No. 493,551, filed March 10, 1955, now Patent No. 2,801,908, issued August 6, 1957, in which each of the nuclear carbon atoms bonded to nuclear sulfur bears an amino group and one of the other nuclear carbon atoms bears a cyano group and the remaining nuclear carbon atom bears a group which is directly bonded thereto by carbon which is further bonded solely to from one to two elements of atomic number 6 to 8 and is multiply bonded to one of these elements. These cyano-containing diaminothiophenes (2,5-diamino-3-cyanothiophenes) have the general structural formula

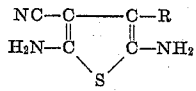

where R is a group which is directly and singly bonded to nuclear carbon of the thiophene ring by a carbon atom which is further bonded solely to from one to two elements of atomic number 6 to 8, i. e. carbon, nitrogen or oxygen, and is multiply bonded to one of these elements.

It is an object of this invention to provide new aromatic aldehyde derivatives of 2,5-diaminothiophenes and a method for their preparation. A further object is to provide new substituted thiophenes which have both cyano and aromatic methyleneamino groups attached to the thiophene nucleus. Another object of this invention is to provide new aromatic methyleneamino substituted thiophenes which are highly colored and can be used as dyes and pigments. Other objects will appear hereinafter.

These and other objects of this invention are obtained by providing new substituted thiophenes in which at least one of the nuclear carbon atoms bonded to nuclear sulfur bears an aromatic methyleneamino group and the other nuclear carbon atom bonded to nuclear sulfur bears an amino or an aromatic methyleneamino group, at least one of the other nuclear carbon atoms of the thiophene nucleus bears a cyano group and the remaining nuclear carbon atom bears a group which is directly bonded thereto by carbon which is further bonded solely to from one to two elements of atomic number 6 to 8 and is multiply bonded to one of these elements.

The new products of this invention have the general structural formula

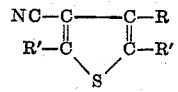

wherein R is a group which is directly and singly bonded to nuclear carbon of the thiophene ring by a carbon atom which is further bonded solely to from one to two elements of atomic number 6 to 8, i. e., to carbon, nitrogen or oxygen, and is multiply bonded to one of these elements, at least one of the R' groups is an aromatic methyleneamino group and the other R' group is an amino group or preferably an aromatic methyleneamino group. The carbon atom in the R group which is singly bonded to nuclear carbon of the thiophene ring and is further multiply bonded to carbon, nitrogen or oxygen does not have hydrogen directly attached to it. R is preferably a cyano, —CN, group although it can be a phenyl, C₆H₅—, carboalkoxy, —COOalkyl, or carbamyl, —CONH₂ group, particularly such groups which contain no more than 6 carbon atoms.

The new compounds obtained by the reaction of 2,5-diamino-3,4-dicyanothiophene with an aromatic aldehyde have at least one of the amino groups of the thiophene replaced by a —N═CHAr group wherein Ar is an aromatic group, preferably of up to 12 carbon atoms. In the preferred substituted thiophenes of this invention each of the nuclear carbon atoms bonded to nuclear sulfur bears an arylmethyleneamino group and in the most preferred substituted thiophenes each of the remaining nuclear carbon atoms bears a cyano group. The preferred compounds are those that have both amino groups replaced by —N═CHAr groups where Ar is an aromatic radical. The most preferred compounds have the structural formula

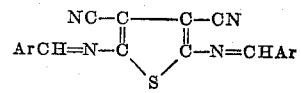

where Ar is an aryl radical such as phenyl, aminophenyl, alkylaminophenyl, dialkylaminophenyl, nitrophenyl, hydroxyphenyl, dihydroxyphenyl, alkylphenyl, cyanoalkylaminophenyl, and other substituted phenyl radicals, particularly of up to twelve carbon atoms.

These new compounds, and particularly the 2,5-bis(aromatic methyleneamino)-3,4-dicyanothiophenes, are high melting colored compositions of use as dyes and pigments.

The products of this invention are aromatic aldehyde derivatives of at least one of the amino groups of 2,5-diaminothiophenes which have at least one cyano group on the thiophene nucleus. These new products are obtained by the reaction of an aromatic aldehyde with a substituted thiophene in which each of the nuclear carbon atoms bonded to nuclear sulfur bears an amino group and one of the other nuclear carbon atoms bears a cyano group and the remaining nuclear carbon atom bears a group which is directly bonded thereto by carbon which is further bonded solely to from one of two elements of automic number 6 to 8 and is multiply bonded to one of these elements. These cyano-containing 2,5-diaminothiophenes (2,5-diamino-3-cyanothiophenes) have the formula

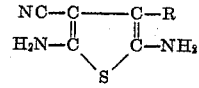

where R is a group which is directly and singly bonded to nuclear carbon of the thiophene nucleus by a carbon atom which is further bonded solely to from one to two elements of atomic number 6 to 8, i. e., carbon, nitrogen or oxygen, and is multiply bonded to one of these elements. R is preferably a cyano group, —CN, although it can be a phenyl, C₆H₅—, carboalkoxy, —COOalkyl, or carbamyl, —CONH₂, group. Examples of such 2,5-diamino-3-cyanothiophenes are 2,5-diamino-3,4-dicyanothiophene, 2,5-diamino-3-cyano-4-phenylthiophene, 2,5-diamino-3-cyano-4-carbethoxythiophene and 2,5-diamino-3-cyano-4-carbamylthiophene. The 2,5-diamino-3-cyanothiophenes having an aryl group in the 4-position are obtained by the reaction of a water-soluble inorganic sulfide under basic conditions with polycyano compounds of the formula $(NC)_2C=C(CN)C_6H_5$ or $$(NC)_2CHCH(CN)C_6H_5.$$

Compounds of the formula wherein R is carbalkoxy or carbamyl are obtained by hydrolysis of the corresponding dicyanothiophene.

The following examples, in which the parts are by weight, further illustrate the preparation and properties of the new compounds of this invention:

EXAMPLE I

*2,5-bis(benzylideneamino)-3,4-dicyanothiophene*

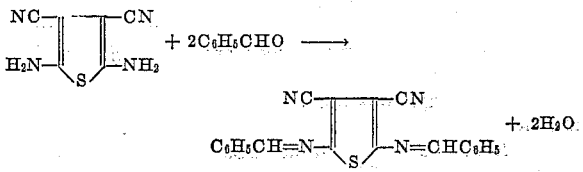

A mixture of 1.64 parts of 2,5-diamino-3,4-dicyanothiophene and 4.24 parts of benzaldehyde was heated on an oil bath at 130–140° C. for thirty minutes, with occasional stirring with a glass rod. The thiophene dissolved and a bulky mass of yellow crystals formed. Small amounts of additional benzaldehyde were added from time to time to maintain a liquid consistency. The mixture was cooled and diluted with benzene. The crystals were collected on a filter, washed with benzene and dried in a desiccator under vacuum. There was obtained 3.19 parts (94%) yield of 2,5-bis(benzylideneamino)-3,4-dicyanothiophene as bright yellow needles. Recrystallization from chlorobenzene, treating with decolorizing charcoal, and washing the crystals with benzene gave 1.80 parts of long bright yellow needles, M. P. 297–298° C.

*Analysis.*—Calcd. for $C_{20}H_{12}N_4S$: C, 70.58; H, 3.55; N, 16.46; S, 9.40; M. W., 340.3. Found: C, 70.76; H, 3.70; N, 16.51; S, 9.46; M. W., 435. The ultraviolet-visible spectrum had an absorption maximum at 426 m$\mu$, with a specific extinction value of 90. The calculated molar extinction value was 30,600. The infrared spectrum had bands at 4.5$\mu$ for conjugated CN; at 6.25, 6.35 and 6.5$\mu$ for C=C, C=N and/or C=S; and strong bands at 13.2 and 14.5$\mu$ for monosubstituted aromatic group.

EXAMPLE II

*2,5-bis(p-nitrobenzylideneamino)-3,4-dicyanothiophene*

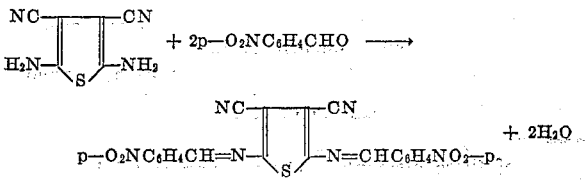

A total of 4.92 parts of 2,5-diamino-3,4-dicyanothiophene and 16.29 parts of p-nitrobenzaldehyde (M. P. 104–106° C.) were intimately mixed in a mortar and the mixture transferred to a flask. The flask was heated in an oil bath at 150–170° C. for twenty minutes and about 20 parts of nitrobenzene added with heating continued at 150–160° C. for an additional fifteen minutes, with occasional stirring with a glass rod. The mixture was allowed to cool and then diluted with 60 parts of benzene. The solid was collected on a filter, washed with benzene and dried in a vacuum desiccator. There was obtained 11.9 parts (92% yield) of 2,5-bis(p-nitrobenzylideneamino)-3,4-dicyanothiophene as an orange powder. Recrystallization from a 5:1 mixture of chlorobenzene-nitrobenzene with the use of a decolorizing charcoal gave 7.27 parts of golden orange prisms, which did not melt or decompose up to 300° C.

*Analysis.*—Calcd. for $C_{20}H_{10}O_4N_6S$: C, 55.82; H, 2.34; N, 19.53; S, 7.44. Found: C, 55.99; H, 2.43; N, 19.26; S, 7.29. The ultraviolet-visible spectrum had an absorption maximum at 436 m$\mu$, with a specific extinction value of 84. The calculated molar extinction value was 36,100.

EXAMPLE III

*2,5-bis(p-dimethylaminobenzylideneamino)-3,4-dicyanothiophene*

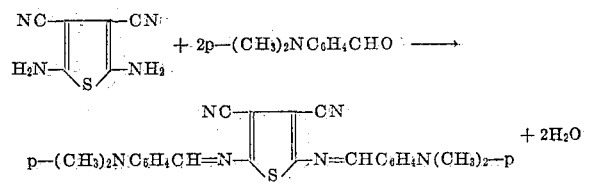

2,5-diamino-3,4-dicyanothiophene (4.92 parts) and 13.41 parts of p-dimethylaminobenzaldehyde (M. P. 73–74° C.) were intimately mixed in a mortar and the mixture transferred to an Erlenmeyer flask. The flask was heated in an oil bath at 140–160° C. for fifteen minutes, stirring occasionally with a glass rod. About twenty parts of nitrobenzene was then added and heating continued at 150–160° C. for an additional twenty-five minutes, with occasional stirring. The mixture was allowed to cool somewhat and then was diluted with 60 parts of hot benzene. The solid lumps were broken up with a glass rod, the mixture heated on a steam bath for twenty minutes and cooled in ice. The crystalline product was collected on a filter, washed thoroughly with benzene and dried in a vacuum desiccator. There was obtained 9.65 parts (75.3%) of 2,5-bis(p-dimethylaminobenzylideneamino)-3,4-dicyanothiophene as violet crystals having a greenish luster. Recrystallization from 4:1 chlorobenzene-nitrobenzene mixture with treatment with decolorizing charcoal gave 6.48 parts of violet green needles which sublimed at 270° C. and began to decompose at 300° C.

*Analysis.*—Calcd. for $C_{24}H_{22}N_6S$: C, 67.59; H, 5.20; N, 19.71; M. W., 426.5. Found: C, 66.55; H, 5.20; N, 19.66; M. W., 485.

The ultraviolet-visible spectrum had an absorption maximum at 525 m$\mu$, with a specific extinction value of 118. The calculated molar extinction value was 50,400.

The infrared spectrum had bands at 4.5$\mu$ for conjugated CN; at 6.2, 6.3 and 6.6$\mu$ for C=C, C=N and/or C=S, and a strong band at 12.3$\mu$ for a para-substituted aromatic.

EXAMPLE IV

*2,5 - bis(p - dimethylaminobenzylideneamino) - 3 - cyano-4-phenylthiophene*

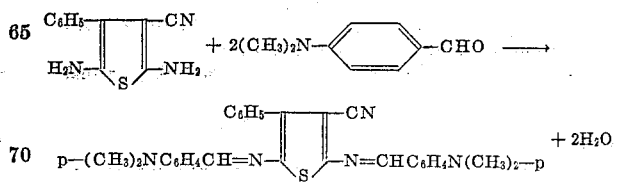

A solution of 1.07 parts of 2,5-diamino-3-cyano-4-phenylthiophene and 1.49 parts of p-dimethylaminobenzaldehyde in 8 parts of ethanol was heated under reflux for twenty-one hours under a nitrogen atmosphere during which time a deep red solid separated from solution. The solution was cooled and filtered, and the product washed with alcohol and dried to yield 1.91 parts (80.3%) of the bis-condensation product, 2,5-bis-(p - dimethylaminobenzylideneamino) - 3 - cyano - 4-phenylthiophene, M. P. 213–220°. Recrystallization twice from tetrahydrofuran gave a purified product as a deep red microcrystalline solid, M. P. 239.5–241°, $\lambda_{max.}$ in acetone 395 m$\mu$ ($\epsilon$24,300), 509 m$\mu$ ($\epsilon$54,900).

*Analysis.*—Calcd. for $C_{29}H_{27}N_5S$: C, 72.92; H, 5.70; N, 14.67; S, 6.71. Found: C, 71.39; H, 5.85; N, 13.81; S, 6.41.

The 2,5-diamino-3-cyano-4-phenylthiophene was prepared by the reaction of hydrogen sulfide with a pyridine solution of tricyanoethylbenzene.

EXAMPLE V

*2,5-bis[p-di(beta-cyanoethyl)aminobenzylidene-amino]-3,4-dicyanothiophene*

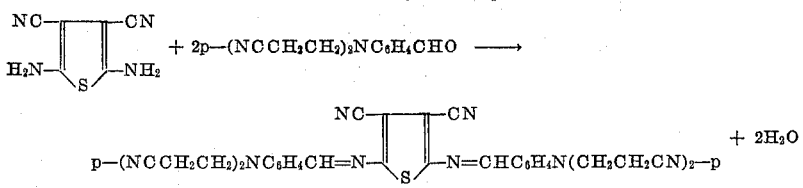

2,5-diamino-3,4-dicyanothiophene (3.28 parts) and 14.22 parts of p-di(beta-cyanoethyl)aminobenzaldehyde (M. P. 119–120° C. prepared according to the general procedure of Campaigne and Archer, Org. Syn. 33, 27 (1953)) were intimately mixed in a mortar and the mixture transferred to a 125 ml. Erlenmeyer flask. The flask was heated in an oil bath at 150–180° for fifteen minutes, stirring occasionally with a glass rod. About 20 parts of nitrobenzene was added and heating continued at 140–160° for an additional twenty minutes with occasional stirring. The mixture was allowed to cool and then diluted with hot benzene. The mixture was cooled in ice, the crystalline product collected on a filter, washed thoroughly with benzene and dried in a vacuum desiccator. There was obtained 11.39 parts (96.7% yield) of 2,5-bis[p-di(beta-cyanoethyl)amino-benzylideneamino]-3,4-dicyanothiophene as bright red crystals. The crude product was recrystallized by dissolving in hot dimethylformamide, treating with decolorizing charcoal, slowly adding boiling water and allowing to cool slowly. The crystals were collected on a filter, washed successively with 1:1 dimethylformamide-water mixture, absolute methanol and benzene and dried in a vacuum desiccator. There was obtained 8.31 parts of bright vermillion needles which did not melt, sublime or decompose up to 300° C.

*Analysis.*—Calcd. for $C_{32}H_{26}N_{10}S$: C, 65.97; N, 4.50; N, 24.04; S, 5.49. Found: C, 66.15; H, 4.12; N, 24.47; S, 5.82.

The ultraviolet-visible spectrum had an absorption maximum at 515 m$\mu$, with a specific extinction value of 100. The calculated molar extinction value was 58,260. The infrared spectrum had bands at 4.45 and 4.5$\mu$ for CN; 6.2, 6.3, 6.45 and 6.55$\mu$ for C=C, C=N and/or C=S.

EXAMPLE VI

*2 - (2,4 - dihydroxybenzylideneamino) - 3,4 - dicyano-5-aminothiophene*

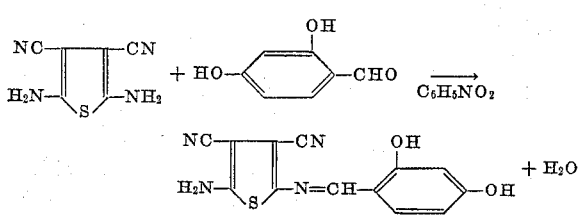

2,5-diamino-3,4-dicyanothiophene (4.92 parts) and 12.4 parts of 2,4-dihydroxybenzaldehyde (M. P. 135–136° C.) were intimately mixed in a mortar and the mixture transferred to a flask. The flask was heated in an oil bath at 150–170° C. for fifteen minutes, stirring occasionally with a glass rod. About 10 parts of nitrobenzene was added and heating continued at 160–170° C. for an additional twenty minutes. The mixture was allowed to cool somewhat and about 16 parts of n-butyl alcohol were added and the solid material triturated. After cooling the mixture further, 50 parts of methanol was added, the crystalline product collected on a filter, washed with methanol and dried under vacuum. There was obtained 8.95 parts of dull orange-red crystalline powder. Two recrystallizations from dimethylformamide-water, treating with decolorizing charcoal, collecting the crystals on a filter and washing successively with dimethylformamide-water, and water, gave 3.37 parts of 2 - (2,4 - dihydroxybenzylideneamino) - 3,4 - dicyano-5-aminothiophene as a bright orange crystalline powder. The product at this stage was triturated with methanol, filtered and washed with methanol. There was finally obtained 3.22 parts of bright orange crystalline powder which did not melt, decompose, or sublime up to 300° C.

*Analysis.*—Calcd. for $C_{13}H_8O_2N_4S$: C, 55.0; H, 2.82; N, 19.71; S, 11.27. Found: C, 55.39; H, 2.97; N, 19.24; S, 10.96.

The ultraviolet-visible spectrum had an absorption maximum at 425 m$\mu$ with a specific extinction coefficient of 110. The calculated molar extinction value was 31,200. The infrared spectrum had bands at 2.8 $\mu$ for OH, at 3.0 $\mu$ for NH$_2$ and/or OH, at 4.5 $\mu$ for CN, and in the 6 $\mu$ region for thiophene and aromatic unsaturation.

EXAMPLE VII

*2,5 - bis(o - hydroxybenzylideneamino) - 3,4 - dicyanothiophene*

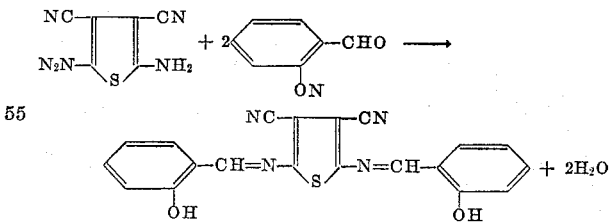

A mixture of 5.2 parts of 2,5-diamino-3,4-dicyanothiophene, 23 parts of salicylaldehyde and 0.15 part of p-toluenesulfonic acid was stirred and heated at 150–170° C. for fifteen minutes. Nitrobenzene (17.5 parts) was added and heating was continued for fifteen minutes. The mixture was cooled to 70° C., 65 parts of benzene was added, and the resultant slurry was cooled to 5° C. and filtered. There was obtained 10.8 parts (91% yield) of 2,5-bis(o-hydroxybenzylideneamino)-3,4-dicyanothiophene as an orange solid sparingly soluble in most solvents, except dimethylformamide. An analytical sample was prepared by recrystallizing some of the product from dimethylformamide; M. P. >300° C.; $\lambda_{max}$ 445 m$\mu$ (in acetone) ($\epsilon$37,600).

*Analysis.*—Calcd. for $C_{20}H_{12}N_4O_2S$: C, 64.5; H, 3.3; N, 15.1. Found: C, 64.8; H, 3.3; N, 15.0.

EXAMPLE VIII 2,5 - bis(p - N - beta - cyanoethyl - N - methylamino-
benzylideneamino)-3,4-dicyanothiophene

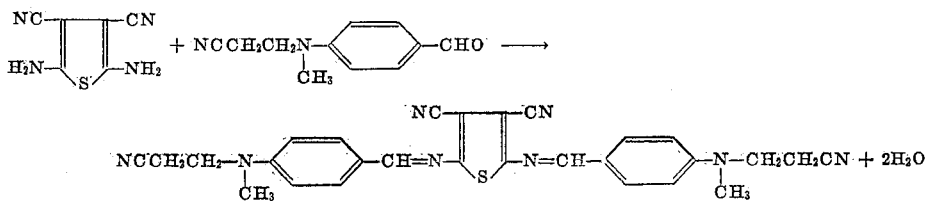

The general procedure of Example VII was repeated except that p-N-cyanoethyl-N-methylaminobenzaldehyde was used as the aldehyde in the absence of p-toluenesulfonic acid. There was obtained in 90% yield 2,5,-bis-(p - N - beta - cyanoethyl - N - methylaminobenzylideneamino)3,4-dicyanothiophene as a dark purple solid, M. P. 258–260° C. and having a $\lambda_{max}$ in acetone of 511 m$\mu$ ($\epsilon$37,400).

*Analysis.*—Calcd. for $C_{28}H_{24}N_8S$: C, 66.7; H, 4.8; N, 22.2. Found: C, 66.2; H, 4.8; N, 21.8.

One-gram samples of acetate rayon nylon, "Dacron" polyester yarn and "Orlon" acrylic yarn were dyed yellow to golden brown and violet with the 2,5-bis(p-nitrobenzylideneamino)-3,4-dicyanothiophene and the 2,5-bis-(p - dimethylaminobenzylideneamino) - 3,4 - dicyanothiophene respectively. Dyeings on acetate rayon, nylon and "Orlon" acrylic yarn with the 2,5-bis[p-di(beta-cyanoethyl)aminobenzylideneamino] - 3,4 - dicyanothiophene gave pale red fabrics. The dyeings were carried out at 100° C. in aqueous dispersions by adding 15–20 parts of the dye in 200–300 parts of hot dimethylformamide to 4000–5000 parts of boiling water containing 15–20 parts of a detergent and a small amount of a carrier such as o-phenylphenol (15–20 parts as the sodium salt neutralized with dilute acetic acid) or benzoic acid. Each sample of cloth was boiled for one hour and rinsed thoroughly with water.

The hydrolytic stabilities of these compounds at pH of 4–8 was tested by boiling in water for 22 hours. In each case the major portion of the derivative was recovered unchanged.

The 2,5-diamino-3-cyanothiophenes having a cyano or phenyl group in the 4-position employed as starting materials in the process of this invention are obtained by the reaction of a water-soluble inorganic sulfide under basic conditions with a polycyano compound of the formula $(NC)_2CHCH(CN)R$, i. e., a polycyanoethane, or a polycyano compound of the formula $$(NC)_2C=C(CN)R$$

i. e., a polycyanoethylene, wherein R is a cyano or phenyl radical which is directly and singly bonded to chain carbon of the polycyano compound. The 2,5-diamino-3-cyanothiophenes having in the 4-position, carbalkoxy or carbamyl groups are obtained by conversion of one of the cyano groups of 2,5-diamino-3,4-dicyanothiophene. The cyano group is changed to the iminoether hydrochloride by reaction with alcoholic hydrogen chloride. Hydrolysis gives the carbalkoxy from which the carbamyl is obtained by reaction with ammonia. The preferred compounds are those in which the substituent in the 4-position (R) is up to 6 carbon atoms and includes —CN, —COO(CH$_2$)$_{1-5}$H, 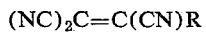 —C$_6$H$_5$ and —CONH$_2$. Of these compounds, 2,5-diamino-3,4-dicyanothiophene can be prepared as disclosed and claimed in the U. S. patent application of W. J. Middleton, Serial No. 493,551, filed March 10, 1955, now U. S. Patent 2,801,908, issued August 6, 1957, as follows:

A cooled solution of 12.0 parts of sodium sulfide decahydrate in 100 parts of water was mixed rapidly with a solution of 6.5 parts of tetracyanoethane in 24 parts of acetone. The solution immediately became light orange in color and a pink precipitate began to form. The precipitate was collected on a filter, washed with water, and dried. The material was dissolved in dimethylformamide, treated with decolorizing charcoal, filtered and after addition of water, light pink needles separated. There was obtained 2.0 parts of 2,5-diamino-3,4-dicyanothiophene which sublimed at 240–244° with some decomposition.

2,5-diamino-3-cyano-4-phenylthiophene can be prepared by the reaction of phenyl-1,1,2-tricyanoethane with hydrogen sulfide as follows:

To 20 parts of pyridine saturated with hydrogen sulfide was added rapidly 5 parts of tricyanoethylbenzene, i. e., phenyl-1,1,2-tricyanoethane (obtained by the general procedure of Corson and Stoughton, J. Am. Chem. Soc. 50, 2825 (1928)). Hydrogen sulfide gas was bubbled through this solution for an additional eight minutes while the temperature of the solution was held below 55° C. by intermittent cooling. The solution was poured onto ice, the aqueous solution extracted with ether and the combined ether extracts dried over anhydrous magnesium sulfate. Evaporation of most of the solvent on the steam bath and addition of carbon tetrachloride to the residue produced 3.78 parts (63.6%) of 2,5-diamino-3-cyano-4-phenylthiophene, a pale green solid, M. P. 84–99° C. (with previous softening).

Tetracyanoethylene can be prepared as disclosed in Cairns and Graef U. S. patent application Serial No. 382,842, filed September 28, 1953, by reaction of sulfur monochloride with malononitrile as in the following procedure:

Sulfur monochloride (70 parts) was added slowly during the course of six hours to a refluxing solution of 33 parts of malononitrile in about 600 parts of chloroform. After the mixture refluxed for an additional 20 hours, the chloroform was removed by heating on a steam bath. The crystalline residue was extracted with diethyl ether in a Soxhlet extractor. Evaporation of the ether extract gave crude tetracyanoethylene which was further purified by sublimation at 100° C. under a pressure of 1–2 mm.

Tetracyanoethane can be prepared as disclosed in Heckert U. S. patent application Serial No. 421,997, filed April 8, 1954, now abandoned, and of which U. S. Patent 2,788,356, issued April 9, 1957, is a continuation-in-part, by reduction of tetracyanoethylene, e. g., a solution of 19.2 parts of tetracyanoethylene in about 60 parts of acetone was cooled in an ice bath and about 30 parts of mercaptoacetic acid added. The white needles obtained were recrystallized from acetone/water solution.

The new aromatic aldehyde derivatives of the 2,5-di-aminothiophenes are obtained in high yields by the reaction of the aminothiophene with at least a molar amount of an aromatic aldehyde. To insure preparation of the di(aromatic methyleneamino) thiophene in high yields, the aromatic aldehyde should be present initially in at least a sufficient amount to react with all of the amino groups, i. e., at least two mols of the aldehyde to one of the diamine. When the amount of aldehyde is less, the yield of the di-condensation product decreases with an increase in yield of mono condensation product. The latter is generally formed in maximum yields when the molar ratio of aldehyde to diamine is one to one. However, when aromatic aldehydes are employed which have substituents on the aromatic ring ortho to the aldehyde group, the rate of reaction is decreased and the mono derivative can be the major product even when excess of the aldehyde is present. The presence of a small amount of acid, such as shown in Example VII, favors formation of the di-derivative over the mono-derivative.

The reaction is readily brought about by mixing the aminothiophene with the aromatic aldehyde. The reaction is carried out in a liquid medium. Solvents which are non-reactive with the thiophene and aldehyde can be employed although an excess of the aldehyde, when it is liquid, can be used as both reactant and solvent.

Although the reaction can take place at room temperature, it is faster at elevated temperatures. The temperature can be as high as the decomposition point of any of the reactants involved; however, the reaction is generally conducted at temperatures of 100–200° C. The time is dependent upon the temperature and is not critical, with the time of reaction generally from a few minutes to an hour or more frequently used.

The aromatic aldehydes useful for reaction with the 2,5-diaminothiophenes to form the arylmethyleneamino derivatives include those which have an aldehyde group, —CHO, directly attached to the nucleus of an aromatic radical. The aromatic radical can be an aryl radical and can have attached to aromatic carbon, groups which are non-reactive with the aldehyde group or relatively non-reactive with the amino group. The aromatic aldehydes thus include aryl aldehydes and aryl aldehydes having cyano, tert-amino, bromo, chloro, hydroxy, nitro, and hydrocarbon groups also attached to the aromatic nucleus. Aldehydes that are useful in addition to those of the examples include 4-cyanobenzaldehyde, 2-chlorobenzaldehyde, 3-bromobenzaldehyde, and naphthaldehyde. Preferably the aldehyde has a carbon content of up to 13 carbons and has hydrogen on at least one of the nuclear carbons which is next to that bearing the aldehyde group.

The new products of this invention are less soluble than the starting materials and are generally readily isolated and purified by crystallization or fractional precipitation. They are relatively high melting and highly colored. They possess very high molar extinction coefficients ($\epsilon_{max}$=30,000 to 58,000) which is a particularly important quality for good dyes and pigments. (For a discussion of the significance of spectral bands see Gilman, "Organic Chemistry," vol. III, pages 123–128, John Wiley, New York (1953).)

In addition to the use of these new compounds as dyes for textiles, they are useful as dyes and pigments in the coloration of plastics or in the formulation of paints. They are also useful in the preparation of filters for optical and photographic work.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A substituted thiophene of the formula

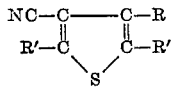

wherein R is a radical selected from the class consisting of cyano, phenyl, carbamyl and carboalkoxy of no more than six carbon atoms, at least one of the R' groups is a —N=CHAr group wherein Ar is a radical of no more than 12 carbon atoms selected from the class consisting of phenyl, nitrophenyl, dialkylaminophenyl, cyanoalkylaminophenyl, hydroxyphenyl, dihydroxyphenyl, N-cyanoalkyl-N-alkylaminophenyl, cyanophenyl, chlorophenyl and bromophenyl, and the other R' group is selected from the class consisting of the amino radical and said —N=CHAr group wherein Ar is defined as aforesaid.

2. 2,5-bis(benzylideneamino)-3,4-dicyanothiophene.

3. 2,5-bis(p-nitrobenzylideneamino)-3,4-dicyanothiophene.

4. 2,5-bis(p-dimethylaminobenzylideneamino)-3,4-dicyanothiophene.

5. A substituted thiophene of the formula

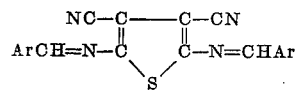

wherein Ar is dialkylaminophenyl of no more than 12 carbon atoms.

6. A substituted thiophene of the formula

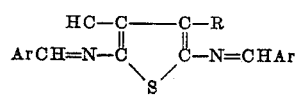

wherein R is phenyl and Ar is dialkylaminophenyl of no more than 12 carbon atoms.

7. A substituted thiophene of the formula

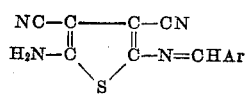

wherein Ar is phenyl substituted with from one to two hydroxyl groups.

8. 2,5-bis(p-dimethylaminobenzylideneamino)-3-cyano-4-phenylthiophene.

9. 2-(2,4-dihydroxybenzylideneamino)-3,4-dicyano-5-aminothiophene.

10. Process for preparing an aryl methylene-amino-substituted 3-cyanothiophene which comprises reacting (a) an aryl aldehyde of no more than 13 carbon atoms wherein the aryl radical is attached directly to the aldehyde group CHO and is selected from the class consisting of phenyl, nitrophenyl, dialkylaminophenyl, cyanoalkylaminophenyl, hydroxyphenyl, dihydroxyphenyl, N-cyanoalkyl-N-alkylaminophenyl, cyanophenyl, chlorophenyl and bromophenyl, with (b) a substituted thiophene having the formula

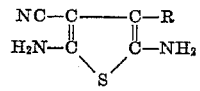

wherein R is a radical selected from the class consisting of cyano, phenyl, carbamyl and carboalkoxy of no more than six carbon atoms.

11. Process for preparing 2,5-bis(benzylideneamino)-3,4-dicyanothiophene which comprises reacting benzaldehyde with 2,5-diamino-3,4-dicyanothiophene.

12. Process for preparing 2,5-bis(p-nitrobenzylideneamino)-3,4-dicyanothiophene which comprises reacting p-nitrobenzaldehyde with 2,5-diamino-3,4-dicyanothiophene.

13. Process for preparing 2,5-bis(p-dimethylaminobenzylideneamino)-3,4-dicyanothiophene which comprises reacting p-dimethylaminobenzaldehyde with 2,5-diamino-3,4-dicyanothiophene.

14. Process for preparing 2,5-bis(p-dimethylaminobenzylideneamino)-3-cyano-4-phenylthiophene which comprises reacting p-dimethylaminobenzaldehyde with 2,5-diamino-3-cyano-4-phenylthiophene.

15. Process for preparing 2-(2,4-dihydroxybenzylideneamino)-3,4-dicyano-5-aminothiophene which comprises reacting 2,4-dihydroxybenzaldehyde with 2,5-diamino-3,4-dicyanothiophene.

16. Process for preparing dialkylaminophenylmethyleneamino-substituted 3-cyanothiophene which comprises reacting dialkylaminobenzaldehyde of no more than 13 carbon atoms with 2,5-diamino-3,4-dicyanothiophene.

17. Process for preparing dialkylaminophenylmethyleneamino-substituted 3-cyanothiophene which comprises reacting dialkylaminobenzaldehyde of no more than 13 carbon atoms with 2,5-diamino-3-cyano-4-phenylthiophene.

18. Process for preparing a compound selected from the class consisting of monohydroxyphenyl- and dihydroxyphenyl- methyleneamino-substituted 3-cyanothiophenes which comprises reacting benzaldehyde substituted with from one to two hydroxyl groups on the benzene nucleus with 2,5-diamino-3,4-dicyanothiophene.

References Cited in the file of this patent

UNITED STATES PATENTS 2,513,996  Haury ------------------ July 4, 1950

UNITED STATES PATENT OFFICE
Certificate of Correction

Patent No. 2,849,449                               August 26, 1958

Arthur C. Cope et al.

It is hereby certified that error appears in the printed specification of the above numbered patent requiring correction and that the said Letters Patent should read as corrected below.

Column 7, line 23, after "rayon" insert a comma; column 10, lines 17 to 20, claim 6, the formula should appear as shown below instead of as in the patent—

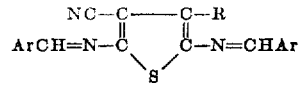

Signed and sealed this 18th day of November 1958.

[SEAL]

Attest:
KARL H. AXLINE,
*Attesting Officer.*

ROBERT C. WATSON,
*Commissioner of Patents.*